Figure 3:
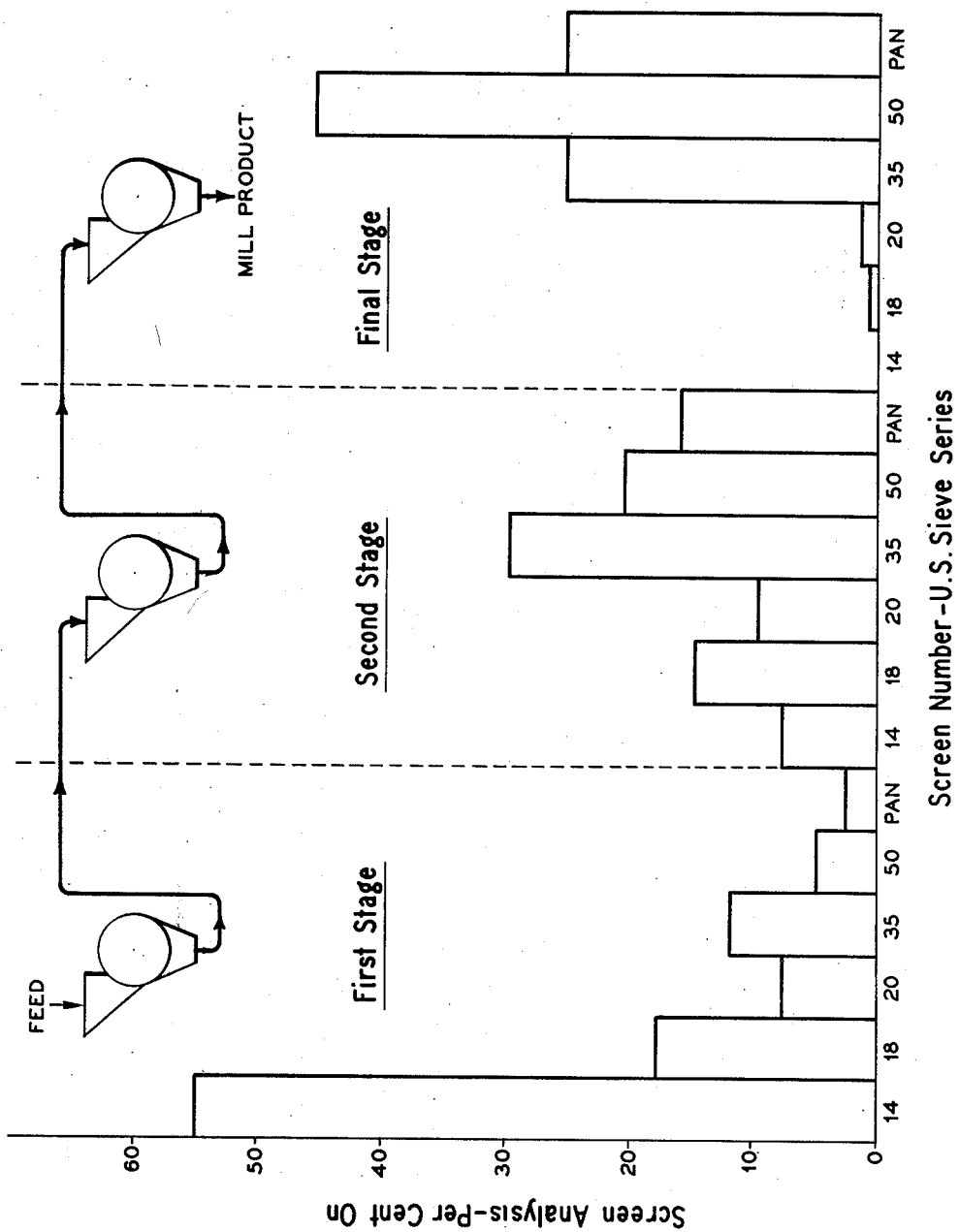

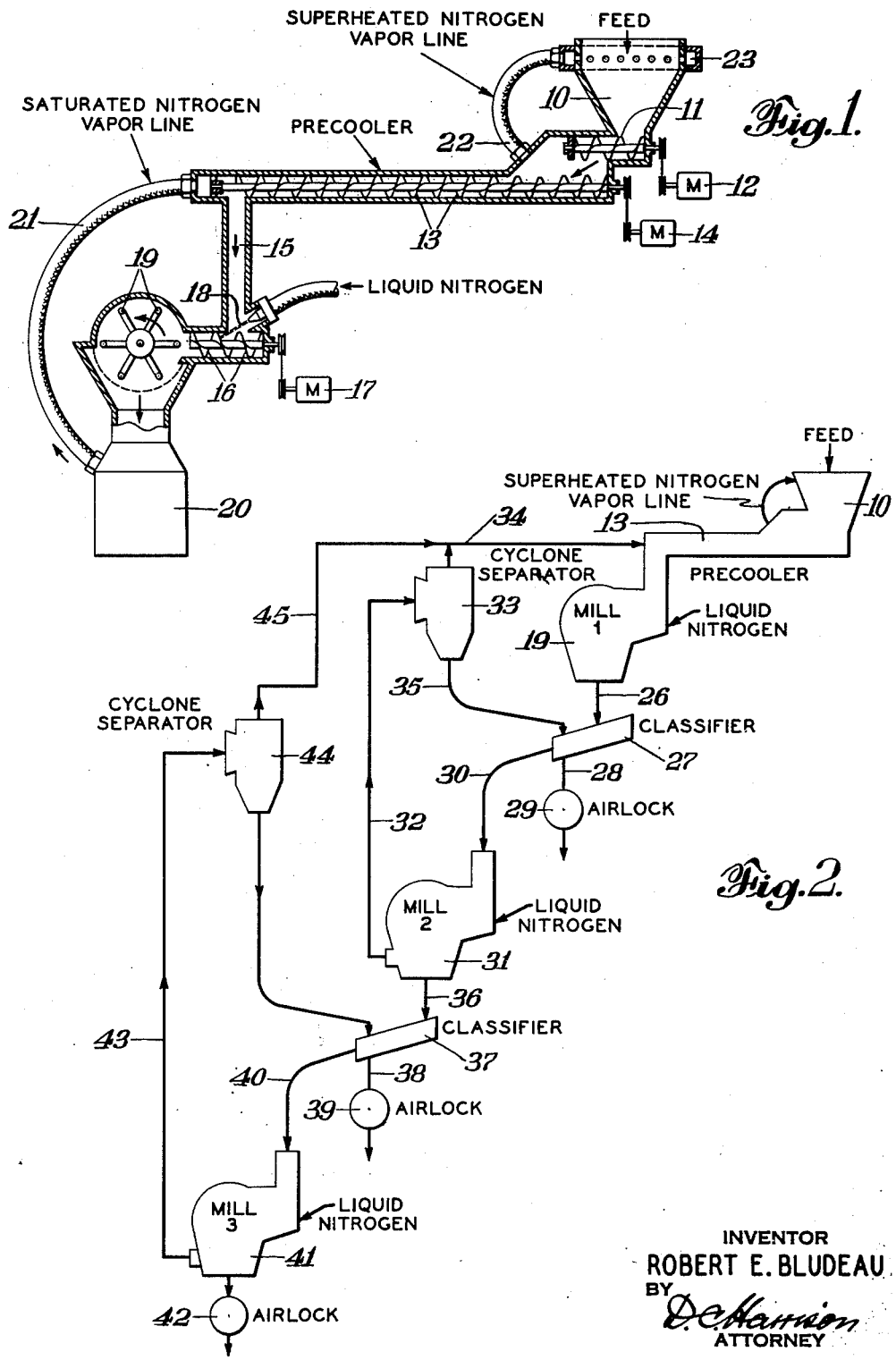

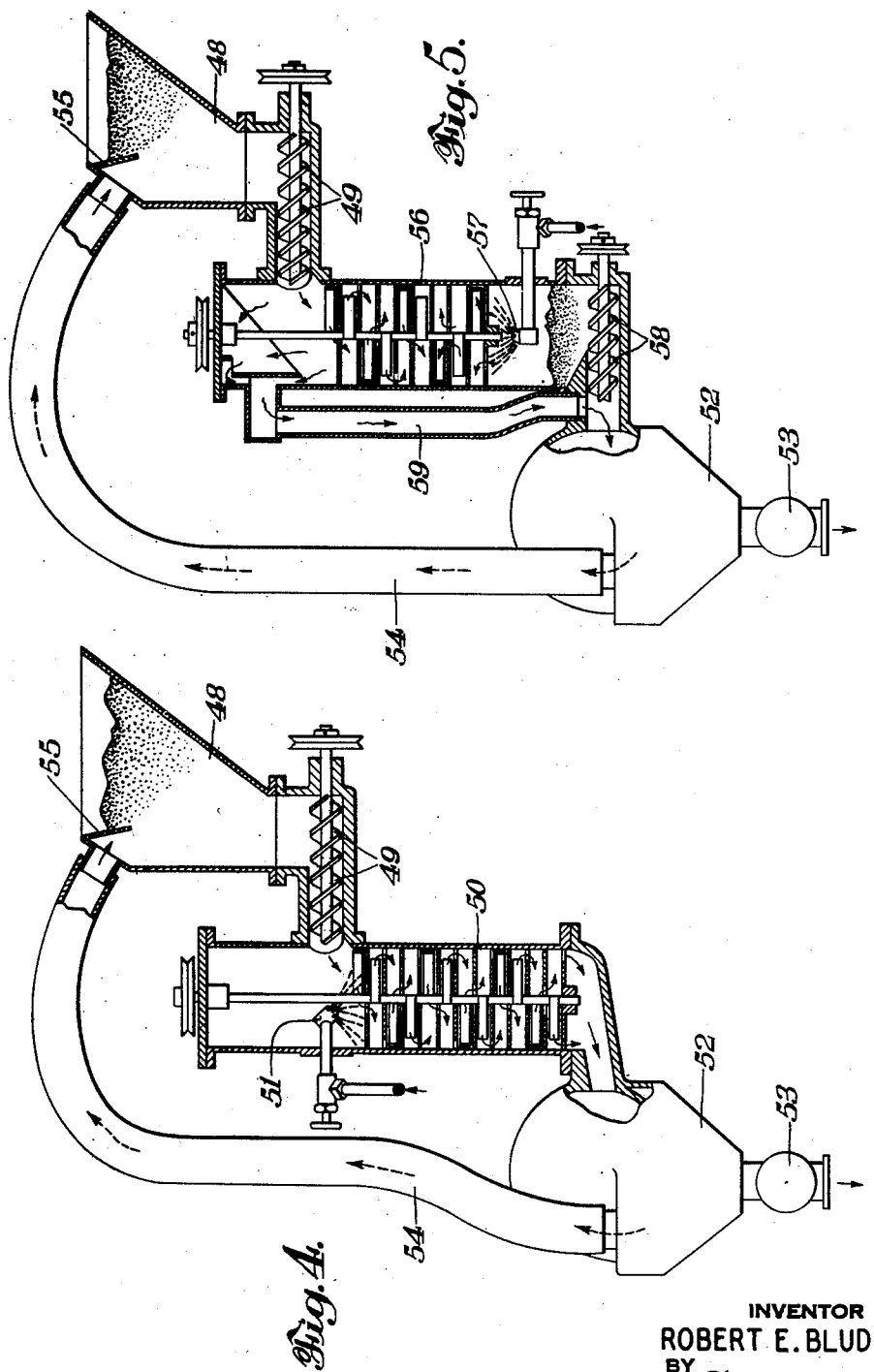

Patented Sept. 2, 1952

2,609,150

UNITED STATES PATENT OFFICE 2,609,150

MECHANICAL PULVERIZATION OF REFRIGERATED PLASTICS

Robert E. Bludeau, Denville, N. J., assignor, by mesne assignments, to Union Carbide and Carbon Corporation, a corporation of New York Application November 5, 1949, Serial No. 125,739

10 Claims. (Cl. 241—15)

This invention relates to a process and apparatus for pulverizing those thermoplastic resins which are too tough to be capable of being powdered by known processes or mills in a practicable manner. While the invention is adapted for reducing any such resin to powder, it is not economically adapted for treatment of those which are readily capable of being pulverized in the ordinary impact or other mill at less expense and without the use of the low temperature refrigerants employed here.

One characteristic of the materials for which this invention is especially adapted is the fact that they are good thermal insulators. This means that in an impact mill heat of impact is developed within particles without any satisfactory way of cooling them to prevent the heat raising the particles to softening or melting temperature. Another characteristic is a substantial degree of toughness, that is, substantial energy absorption is necessary for fracture. One example of materials for which this invention is adapted is plasticized ethyl cellulose, which is notoriously tough at low natural temperatures. Another material difficult to reduce to powder by ordinary methods has been polyethylene.

At first it was though that all that was needed to powder these and other materials was a refrigerant which was substantially colder than the brittle temperature of the material to render any of these materials brittle enough to pulverize by impact. Whether or not such were true in theory, it is not commercially economical. One reason why it is so was found to be the large amount of liquid refrigerant like liquid air or liquid nitrogen that was required and also the time necessary to soak even reasonably small particles of the plastics to extract heat within the material below its surface. Several unsuccessful attempts had been made to immerse polyethylene in liquid nitrogen before pulverizing it for the purpose of embrittling it. The material did not apparently get thoroughly chilled well below the surfaces of the material. Also on removal from the liquid refrigerant the surface of the particles absorbed heat en route to the mill. Another difficulty was found to be in the impact mill functioning in a manner similar to a suction pump, sucking in a quantity of air at room temperature to reduce the chilling effect of the liquid refrigerant.

An object of this invention is to provide an efficient method of and apparatus for powdering those thermoplastics which are tough and difficult to powder in conventional ways. More specifically an object is to pulverize those more difficult materials, such as polyethylene and ethyl cellulose, in an efficient manner. A further object is to provide an enclosed system in which the difficult materials to pulverize may be cooled without circulating ambient air into a mill in objectionable quantity. Another object is to provide a method for treating such materials by chilling at least the outer portions of each particle immediately before entering an impact mill so that at least surface portions of the materials are chilled well below their brittle points. Yet a further object is to effect such cooling and breaking up by impact in alternate operations in order to increase the fineness of material that is pulverized. Another object is to carry out the aforesaid impact pulverization under at least slight superatmospheric pressure so that no warm air is drawn in with the material supply. Still a further object is to promote efficient operation of this process and apparatus by precooling the material fed to the pulverizing mill with the aid of vaporized refrigerant moving either countercurrent or in parallel flow to the supplied material.

According to this invention, the foregoing disadvantages have been overcome and an efficient manner of chilling and pulverizing troublesome materials like polyethylene, ethyl-cellulose, and others has been discovered. Yet another view of the present invention may be said to reside in the discovery of what objections and difficulties were possessed by the various prior attempts to accomplish the same results. More specifically, this invention contemplates chilling the particles of plastic immediately before they are fed to an impact mill, whereby at least some surface portions of the particles are chilled to well below their brittle temperature. This chilling is obtained by spraying precooled material with a liquid refrigerant such as liquid nitrogen immediately before the material is subjected to impact under slightly super-atmospheric pressure and the vaporized refrigerant is passed in contact with the incoming material for precooling it. The escaping nitrogen serves to prevent admission to the mill of atmospheric air at room temperatures. At least the brittle exterior of the chilled pieces is thought to break up into smaller particles before their temperature has risen too high in an impact mill.

Fig. 1 illustrates a single stage apparatus for carrying out the present invention. Fig. 2 is a diagrammatic representation of a multi-stage process and apparatus used in this invention.

Fig. 3 is a chart indicating the percentage of fines of different sizes at the conclusion of each stage of a three-stage process when powdering polyethylene. Fig. 4 illustrates another type of apparatus for precooling and powdering the materials. Fig. 5 shows a somewhat similar apparatus to that of Fig. 4, the chief difference residing in the fact that the liquid refrigerant is sprayed on the material in a lower instead of in an upper portion of a heat exchanger.

One material treated is a polyethylene having a molecular weight of 20,000 and a melting temperature of between 105° C. and 110° C. This material was sheared into lengths of about $\frac{5}{16}''$ from rods having a diameter of about $\frac{5}{16}''$ and placed in the hopper 10 so that it is fed by the preliminary feed screw 11, driven by the motor 12 to a main feed screw 13 driven by the motor 14. The material is moved from the right to the left in the drawing of Fig. 1 and then falls down the passage 15 onto the final feed screw 16, driven by the motor 17. Just before the material is fed into a mill for breaking it up, it is sprayed with liquid nitrogen, the spray being indicated by the numeral 18. The impact mill 19 rotates at a rapid rate. After passing through the mill the material falls into receiver 20. The vaporized refrigerant or gaseous nitrogen passes through the line 21 to the left end of the main feed screw 13 where it passes in contact with the material being fed in for reducing its temperature. From the right end of the screw conveyor 13 the vaporized refrigerant is drawn off through the passage 22 to a jacket 23 around the hopper 10.

The impact mill used had a diameter of about 8", and a speed of 10,000 R. P. M. It developed a linear velocity in the particles of substantially 22,500 ft. per minute. The lower molecular weight polyethylene materials having lower softening temperatures are easier to powder because their impact strength is less than is that of the materials having the higher molecular weight and melting temperature. The microscopic crystals of polyethylene are believed to be of the order of a micron or a millionth of a meter in size. Its crystalline phase exists from below its brittle point up to within a few degrees of its melting temperature. The impact strength of polystyrene is .26 to .6 foot pound per inch of notch ½ inch x ½ inch notched bar Izod test. The impact strength of ethyl-cellulose is 2. to 11.5, and that for the vinyl chloride resin is .3 to 1.0 in the same units. The impact strength of polyethylene is from 3 to as high as 10 ft.-pounds per inch of notch ½ inch x ½ inch notched bar Izod test. The thermal conductivity of polyethylene is 6 to 8 $\times 10^{-4}$ calories per square centimeter per second per degree Centigrade per centimeter in thickness. The polyvinylidene chloride known as Saran has a thermal conductive character of only $2.2 \times 10^{-4}$ calories per square centimeter per second per degree Centigrade per centimeter in thickness. Vinyl chloride (plasticized) has a thermal conductivity of 3.9 to 4.0 in the same units. Polystyrene has a thermal conductivity of 1.8 to 2.0; and ethyl cellulose 4. to 7. thermal conductivity, each in the same aforementioned units. The other polycrystalline plastics and other tough thermoplastics have impact strengths and thermal insulating properties between the extremes mentioned. The polyethylene has the greatest percentage elongation at its ultimate strength in tension of 50% to 600%. The percent elongation at its ultimate strength in tension of plasticized vinyl chloride is 2 to 550, of polystyrene 1.5 to 3.5, and of ethyl cellulose 5 to 100. The material known as Saran has the least such elongation, being only 10% to 40% at its ultimate strength in tension. The other polycrystalline and tough plastics have elongations in amounts between the extremes mentioned.

From the left third portion of the diagram in Fig. 3, it may be seen, after this polyethylene material has been fed through the impact mill as described, that a major portion or roughly 55% of the material passed through a 14-mesh screen. Smaller percentages, as indicated in this diagram, passed through the screens of the mesh size indicated in the abscissa.

As shown in Fig. 2, the powdering process for polyethylene is adapted to be carried out more efficiently in a multi-stage operation where greater fineness is desired in the powdered material. The material is fed into the hopper 10 and passes through the main feed screw 13 to an impact mill 19. Liquid nitrogen is supplied to the material just before it is fed into the impact mill in the manner described in connection with Fig. 1. The vaporized refrigerant and powdered material from the mill 19 are discharged through the passage 26 onto the classifier 27. The fines of appropriate size are discharged through the passage 28. In order to prevent warm air getting into the cold material, the pulverized product from the passage 28 is discharged through an air lock 29, that is, batches of the material are discharged without having any substantial amount of the cold gas leak out or an undue quantity of warm air get in. The solid material and vaporized refrigerant from the first stage then passes by the line 30 to the mill 31 of the second stage. Here again, just before the material is fed into the mill 31, liquid nitrogen is sprayed on it. From the mill 31 the vaporized refrigerant rises through the line 32 and enters the cyclone separator 33 in which any solid particles are separated out and passed by the line 35 back into the classifier 27 for removal. The vaporized refrigerant is discharged from the separator 33 through the pipe 34 and enters the main feed screw 13 for precooling the material before it is supplied to the first stage mill. The solid material discharged from the mill 31 passes through the passage 36 to a second classifier 37, from which the powdered material of appropriate size is drawn off through the line 38 and air lock 39 in a manner already described in connection with the drawing off of material from the first stage. The material for further pulverization passes from the classifier 37 through the line 40 into the mill 41 where the material is again sprayed by liquid nitrogen just before its entry into the mill 41. After passage through this mill the material discharges through the air lock 42. The vaporized refrigerant from the mill 41 passes through the line 43 into the separator 44, the gaseous material being discharged through the line 45, which empties into the line 34 for feeding into the precooler 13. Solid particles of material removed from the separator 44 pass by the line 46 into the classifier 37, where they can be discharged through the line 38 as described. In order to prevent particles of excessive size being discharged from any impact mill, a screen having openings of ¼" in size is located on the outlet of the first stage mill 19. The screen on the second mill 31 has openings of ⅛" in size, and on the third mill 41 the openings are $\frac{1}{16}''$ in size. Particles of material larger than those capable of being discharged are thus kept in the mill until broken up.

The center and right portions of the Fig. 3 diagram illustrate how much finer material is obtained from the second and third stages than is the case in the first stage.

Polyethylene is the only material found to need multistage treatment. The other materials mentioned including ethyl cellulose, vinyl chloride (plasticized), vinylidene chloride, a vinylidene-acrylonitrile copolymer, and polystyrene are all adapted for satisfactory pulverization in a single stage process with liquid nitrogen.

Wherever the term ethyl cellulose is used herein, a plasticized material is referred to. With ethyl cellulose granules about 1/8 of an inch in size three separate runs were made of at least two hours duration each. Mill screens of 1/8 inch round and 1/16 inch herringbone openings were used with no apparent difference in the grinding rate or liquid nitrogen consumption. Approximately 95% of the powdered material from the mill passed through a 20-mesh screen. The avergrinding rate was 135 pounds per hour at 4 horsepower. The consumption of liquid nitrogen averaged 5 pounds (6.9 cubic feet) per pound of ethyl cellulose pulverized.

The results from powdering batches of polystyrene are as follows:

| Test No. 1 | 1/16 Round Screen |
|---|---|
| Polystyrene Ground_____lb__ | 42 |
| Liquid Nitrogen Consumed_____lb__ | 37 |
| Liquid Nitrogen required per lb. Product_____lb__ | 0.88 |
| Time of Test_____min__ | 25 |
| Product Grinding Rate_____lb. per hr__ | 100 |
| Grinding Power Required_____H. P__ | 5 |
| Mill Motor Speed_____R. P. M__ | 9,500 |

| Screen Analysis (Rotap) | Mill (36 lb.) | Cyclone Separator | (6 lb.) |
|---|---|---|---|
|  | Percent |  | Percent |
| On 20_____ | 0.3 |  |  |
| Through 20 On 35___ | 12.5 |  |  |
| Through 35 On 42___ | 27.7 | On 42_____ | 4.6 |
| Through 42 On 50___ | 14.5 | Through 42 On 50__ | 6.2 |
| Through 50 On 80___ | 31.0 | Through 50 On 80__ | 34.4 |
| Through 80 On 100__ | 7.5 | Through 80 On 100_ | 18.3 |
| Through 100_____ | 6.5 | Through 100_____ | 36.5 |
| Total_____ | 100.0 | Total_____ | 100.0 |

| Test No. 2 | 3/64 Round Screen |
|---|---|
| Polystyrene Ground_____lb__ | 32 |
| Liquid Nitrogen Consumed_____lb__ | 84 |
| Liquid Nitrogen Required per lb. Product_____lb__ | 2.62 |
| Time of Test_____min__ | 33 |
| Product Grinding Rate_____lb. per hr__ | 58 |
| Grinding Power Required_____H. P__ | 5 |
| Mill Speed_____R. P. M__ | 9,500 |

| Screen Analysis (Rotap) | Mill (28 lb.) | Cyclone Separator (4 lb.) |
|---|---|---|
|  | Percent | Percent |
| On 42_____ | 7.6 | 3.1 |
| Through 42 On 50___ | 8.6 | 3.1 |
| Through 50 On 80___ | 45.5 | 21.8 |
| Through 80 On 100__ | 18.0 | 17.6 |
| Through 100_____ | 20.3 | 54.4 |
| Total_____ | 100.0 | 100.0 |

Tests on powdering a polyvinylidene chloride known as Saran were tried using two sizes of mill screens, one 3/64 of an inch diameter openings and one .039 of an inch in diameter. The smaller screen openings required higher nitrogen consumption per pound at an appreciably lower grinding rate. A screen analysis is as follows:

| Size Screen | Mill | Cyclone | Size Screen | Virgin Saran |
|---|---|---|---|---|
|  | Percent | Percent |  | Percent |
| On 42_____ | 0.4 | 0.1 |  | 0.00 |
| Through 42 On 50___ | 0.6 | 0.5 | On 20_____ | 37.0 |
| Through 50 On 80___ | 15.9 | 6.6 | Through 20 On 100_ | 15.2 |
| Through 80 On 100__ | 57.6 | 20.4 | Through 100 On 200_ | 47.8 |
| Through 100_____ | 25.5 | 72.4 | Through 200_____ |  |
| Total_____ | 100.0 | 100.0 |  | 100.0 |

A summary of the tests on pulverizing Saran follows:

*Summary of tests with double-cut Saran scrap*

| Run No. | Lb. Nitrogen Req'd/lb. Saran Pulverized | Product Ground, lb. | Product Rate, lb./hr. | Screen Opening, Dia. In. | Time Of Run, Min. |
|---|---|---|---|---|---|
| 1 | 1.44 | 66 | 80.7 | 3/64 | 49 |
| 2 | 1.15 | 58 | 75.6 | 3/64 | 46 |
| 3 | 1.41 | 66 | 88.0 | 3/64 | 45 |
| 4 | 1.23 | 70 | 117.0 | 3/64 | 36 |
| 5 | 1.01 | 67 | 115.0 | 3/64 | 35 |
| 6 | 1.8 | 50 | 86 | .039 | 35 |

While toughness strictly depends on the amount of energy a material will absorb without breaking when stiff, it is difficult of precise measurement. Impact strength is a rough but ready indication of toughness. Inasmuch as the impact strength of ethyl cellulose and of polyethylene are each high, it is believed that this process and apparatus are adapted for pulverizing any resinous plastic itself that is not toughened and strengthened by fabric or fibrous reinforcements. This view is confirmed by the properties chart forming a part of the 1947 edition of Modern Plastics encyclopedia, which shows that no other resinous plastic by itself and not strengthened by a fibrous or fabric reinforcement has an impact strength higher than that of ethyl cellulose. Polyethylene was found to be the most difficult material to powder, due not only to its high impact strength or toughness but due also to its large percent elongation at ultimate strength in tension. Any operation depending on shredding or pulling apart polyethylene results in elongated fibrous appearing particles which are not as finely divided as is usually desired. All the materials tried and mentioned herein have a thermal insulating character which when the material is tough and placed in an impact mill makes the heat of impact difficult to remove before particles coalesce.

The material to be powdered is placed in the hopper 48 from which it is fed by the conveyor 49 into the heat exchanger 50, in Fig. 4. Liquefied gaseous refrigerant is sprayed from the nozzle 51 onto the material. The drawing shows the upper shelf in the exchanger 50 is provided with a central aperture and a rotating arm directs material inwardly to pass through said aperture. The next lower shelf has an opening on its radially outer portion toward which the material is directed by a rotating arm. The succeeding shelves are arranged so that the material and vaporized refrigerant travel inwardly over one and outwardly over the next, whereby the movement of the material is in radially opposite directions over any two adjacent shelves.

From the heat exchanger 50 the material moves by gravity into the impact mill 52, which is of the same type as is the mill in Fig. 1. An air lock 53 enables the fine material to be drawn off without substantial loss of cold gas. The vaporized refrigerant at slightly superatmospheric pressure passes from the mill through the pipe 54 into the hopper. A baffle 55 directs the cold gas downward through the material in the hopper. Some of the vaporized refrigerant travels from the heat exchanger 50 through the conveyor 49 for cooling material in the conveyor.

In Fig. 5 the apparatus is quite similar to that in Fig. 4. The heat exchanger 56 has the nozzle 57 for liquefied refrigerant located in the lower portion whereby the refrigerant gas moves counter-current to the travel of the material. As before, some of the vaporized refrigerant moves through the conveyor 49 while the major portion of it enters the mill 52 by way of the duct 59. A conveyor 58 is desirable in the base of the exchanger 56.

The apparatus of either Fig. 4 or Fig. 5 is capable of being used in series for very fine pulverization. Having the spray close to the mill aids in cooling the mill.

Under the process of this invention at least the outside of particles of material are chilled. With thermal insulating materials like polyethylene, for example, the outside of the particles is believed to be placed under slight tension when chilled, which facilitates the rupture of at least the chilled outer portions. An advantage of this invention resides in the shape of the powdered particles from the mill. These are usually sharp pointed and angular, without elongated fibrous appearing projections.

By the term "liquefied gas" is meant a refrigerant which is gaseous at room temperature.

What is claimed is:

1. The method of powdering pieces of tough synthetic thermoplastic resins having a thermal conductivity of as little as $(1.8 \text{ to } 8) \times 10^{-4}$ calories per square centimeter per second per degree Centigrade per centimeter of thickness, having .26 to 10 foot pounds per inch of notch ½ inch x ½ inch bar Izod impact strength, and a percent elongation at ultimate strength in tension of 1.5 to 600, said method comprising chilling precooled surface portions of said pieces of resin to a temperature well below its brittle temperature by a spray of liquid refrigerant having a temperature adjacent that of liquid nitrogen, and substantially immediately thereafter suddenly increasing the velocity of said pieces of resin by subjecting said pieces to impact of a magnitude capable of imparting a linear velocity to them of at least several thousand feet per minute, whereby at least surface particles are broken off from said chilled pieces.

2. A process of chilling and pulverizing by impact a tough thermoplastic resin having a high impact strength of between 2 and 11.5 foot pounds per inch of notch ½ inch x ½ inch notched bar Izod test, said process comprising contacting pieces of the material with a refrigerant which is a liquefied gas having a temperature adjacent that of liquid nitrogen, which has been vaporized and is at slightly superatmospheric pressure while feeding the same to an impact mill, spraying said refrigerant in liquid phase onto said material closely adjacent said mill and after it has been cooled by said vaporized refrigerant to chill at least outer portions of said material to well below its brittle point, subjecting the material to impacts in said mill, separating particles below a predetermined size from those above said size, and precooling the material fed to said mill by said contact with vaporized refrigerant from said mill.

3. The method of powdering pieces of tough synthetic thermoplastic resinous material having thermal conductivity of $(1.8 \text{ to } 8) \times 10^{-4}$ calories per square centimeter per second per degree Centigrade per centimeter of thickness, having impact strength of .26 to 11.5 foot pounds per inch of notch ½ inch x ½ inch bar Izod, and a percent elongation at ultimate strength in tension of 1.5 to 600, said method comprising precooling pieces of said material under slightly superatmospheric pressure, moving the precooled particles of material under said pressure toward a mill for breaking said material into smaller particles just before reaching said mill, chilling precooled surface portions of said pieces of material to a temperature well below its brittle temperature by a spray of liquid refrigerant having a temperature adjacent that of liquid nitrogen, substantially immediately thereafter subjecting said pieces of material to impact for breaking off at least surface particles from said chilled pieces, vaporizing liquid refrigerant from said spray, and returning vaporized refrigerant from said chilling and from said mill for said precooling.

4. A method according to claim 3 in which said precooled thermoplastic resin is moved through said spray after having been moved toward said mill and again contacting said resin and refrigerant after the resin has moved through said spray.

5. A method according to claim 3 in which said thermoplastic is polyethylene and the impact milling and spraying with said liquid refrigerant is performed also in a subsequent stage upon pieces of said resin above a desired size.

6. A method according to claim 3 in which said resin is polyethylene.

7. A method according to claim 3 in which said material is from a class consisting of polyethylene, ethyl cellulose, vinyl chloride, polystyrene, and polyvinylidene chloride.

8. An apparatus for pulverizing tough thermoplastic resinous material comprising an enclosed impact mill, a conveyor for moving pieces of the material toward said mill, an enclosure for said conveyor leading to and connected with said mill, a spray head for liquid refrigerant between said mill and conveyor and closely adjacent said mill and within said enclosure, means for operating said mill, a return passage for vaporized refrigerant from said mill at least partially within said enclosure around the conveyor for retaining the vaporized refrigerant and passing it through the material for precooling said material under slightly superatmospheric pressure to prevent access of air at room temperature to the mill and material being precooled, and an air lock by means of which pulverized material from said mill may be withdrawn without substantial loss of cold gas from said mill or the admission of substantial air at room temperature.

9. An apparatus according to claim 8 in which said spray head is within an upstanding heat exchanger between said conveyor and mill.

10. Apparatus for pulverizing plastics comprising an impact type pulverizing mill, a conveyor for moving material toward said mill, a spray head close beside the mill for directing liquid onto particles of material moving toward said mill, at least a substantial portion of liquid from said head being directed transversely of the moving material at an acute angle thereto adjacent said mill, a supply source of liquefied gas refrigerant having a temperature adjacent that of liquid nitrogen connected to said spray head, an enclosure for said conveyor, spray head, and mill, and a return passage from said mill for vaporized refrigerant through at least a portion of the conveyor enclosure for contacting the moving material and said vaporized refrigerant to precool said material, whereby at least the outer surfaces of particles of plastic are chilled below their brittle temperature just before they enter said mill.

ROBERT E. BLUDEAU.

REFERENCES CITED

The following references are of record in the file of this patent:

UNITED STATES PATENTS

| Number | Name | Date |
|---|---|---|
| 291,018 | Ager | Jan. 1, 1884 |
| 637,465 | Hutchinson | Nov. 21, 1899 |
| 952,351 | Phelp | Mar. 15, 1910 |
| 1,401,445 | Rodgers | Dec. 27, 1921 |
| 1,455,392 | Diepshlag | May 15, 1923 |
| 1,687,300 | Loizillon | Oct. 9, 1928 |
| 1,711,464 | Ruprecht | Apr. 30, 1929 |
| 1,744,927 | Sinclair | Jan. 28, 1930 |
| 1,978,204 | Hurt | Oct. 23, 1934 |
| 2,062,374 | Noel | Dec. 1, 1936 |
| 2,087,492 | Williams | July 20, 1937 |
| 2,234,157 | Jones | Mar. 4, 1941 |
| 2,286,277 | Huddle | June 16, 1942 |
| 2,301,595 | Washburn | Nov. 10, 1942 |
| 2,316,124 | Sheldon | Apr. 6, 1943 |
| 2,347,464 | Cuno | Apr. 25, 1944 |
| 2,480,998 | Brackett | Sept. 6, 1949 |
| 2,505,674 | Knight | Apr. 25, 1950 |

FOREIGN PATENTS

| Number | Country | Date |
|---|---|---|
| 217,325 | Germany | Dec. 27, 1909 |